July 29, 1969 C. E. PLUMMER 3,457,713
TREE SHAKING DEVICE
Filed Oct. 28, 1966
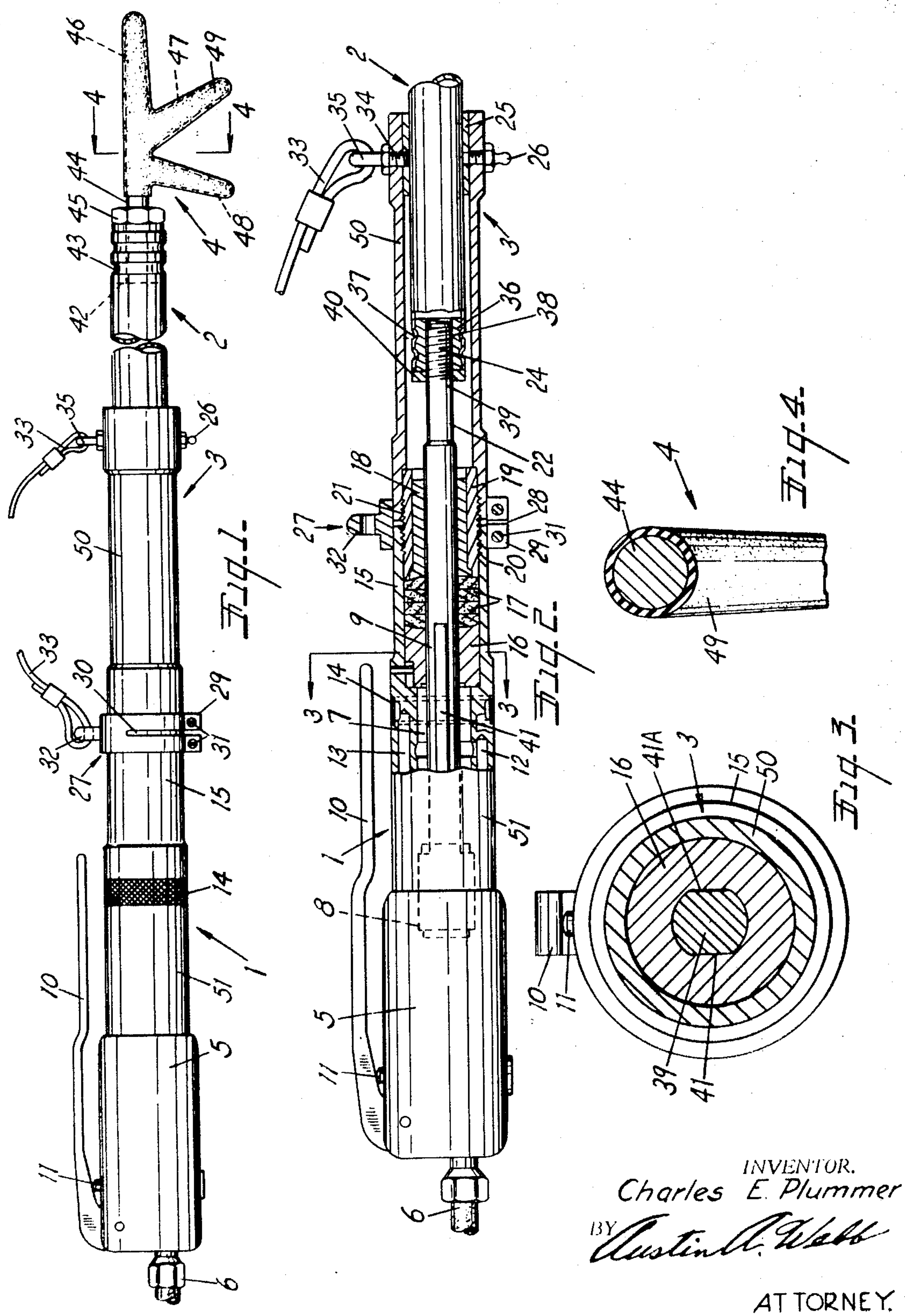
INVENTOR.
Charles E. Plummer
BY Austin A. Webb
ATTORNEY.

3,457,713

TREE SHAKING DEVICE

Charles E. Plummer, R.F.D. 2, Fennville, Mich. 49408

Filed Oct. 28, 1966, Ser. No. 590,382
Int. Cl. A01g *19/00*
U.S. Cl. 56—328 3 Claims

ABSTRACT OF THE DISCLOSURE

An air motor has a piston rod projecting from one end and reciprocably driven. A connecting sleeve engages the end of the motor housing and forms a bearing of an elongated shaker rod. The inner end of the shaker rod has a threaded connection to the piston rod, and a branch engaging head at its outer end. The connecting sleeve has external loops for connecting a shoulder strap to the tool.

This invention relates to improvements in a tree shaking device.

The principal objects of the invention are:

First, to provide a tree shaking device for harvesting fruit and nuts from trees, which device is light and manually portable, having an automatically reciprocable, air pressure operated, impacting device to which is attached a handle that forms a support and guide for light, interchangeable, limb engaging rods that are held in impact receiving engagement with the impacting device to vibrate the limbs of a tree.

Second, to provide an inexpensive attachment for connecting a long, light, limb engaging rod to a power operated impacting tool, the attachment forming a handle for the assembled tool and having connections that hold the parts together and also act as anchors for a shoulder strap for carrying the tool.

Third, to provide a limb shaking device with divergent limb engaging prongs or fingers on the end that are easily and alternatively engageable against, or in hooked engagement with a limb to impart vibration to the limb.

Other objects and advantages of the invention will be apparent from the following description and claims. The drawings, of which there is one sheet, illustrate a highly practical form of the shaker device of the invention.

FIGURE 1 is a fragmentary side elevational view of the shaker device, with the elongated limb engaging rod partially broken away.

FIGURE 2 is an enlarged fragmentary view, partially in longitudinal section, of the connection between the powered reciprocating unit and the limb engaging rod driven thereby.

FIGURE 3 is a transverse cross sectional view taken along the plane of the line 3—3 in FIGURE 2.

FIGURE 4 is a transverse cross sectional view taken along the plane of the line 4—4 in FIGURE 1.

As shown in FIGURE 1, the limb shaking device of the invention consists generally of an air operated automatically reciprocating motor 1 that is drivingly connected to a rod 2 by a combined connecting, guide and handle member 3. The outer or right end of the rod 2 which may be of any desired length is provided with a limb engaging attachment generally indicated at 4.

The motor 1 consists of a body 5 with a connection 6 to a source of compressed air. The body defines a bore 7 within which a piston 8 having a piston rod 9 is reciprocable by air pressure. Valve mechanism not illustrated but under the control of a grip lever 10 and coacting valve plunger 11 functions to admit air pressure alternately to opposite faces of the piston as to the inlet passage 12 and exhaust air through the passage 13 to an exhaust port covered by the screen 14. The air motor is a commercially available article and so is not described in greater detail.

At its outer end the air motor is provided with a neck 15 of reduced diameter in which is positioned a bearing 16 for the piston rod. Packing gaskets 17 are packed around the rod and within the neck by a gland 18 that is pressed into the neck by a tubular packing nut 19 engaged with the internal threads 20 in the outer end of the neck. The nut and the end of the piston rod project from the end of the neck 15.

The connecting and guiding member 3 is a tubular element internally threaded as at 21 to engage the projecting threaded portion of the nut 19. The inner end of the tubular connecting member 3 is positioned around a radially reduced end 22 on the piston rod 9 that is threaded as at 24. Within its outer end the tubular connecting member is provided with a bearing sleeve 25 to which lubricant may be supplied through a grease fitting 26. A clamp member indicated generally at 27 is clamped around the adjacent ends of the neck 15 of the motor and the inner end of the connecting member 3. The clamp member 27 is split axially as at 28 with ears 29 on each side of the split and is further split radially as at 30 to separately clamp the neck of the motor and the end of the connecting member. Screws 31 clamp the ears 29 together as will be understood. The top of the clamp 27 is provided with a perforated ear 32 which forms an anchor or connecting point for one end of a shoulder strap 33 for carrying the tool. At its opposite end the tubular member 3 is provided wtih a retaining screw 34 which extends into a slot in the bearing 25 to retain the bearing in place. The outer end of the screw 34 has an eye 35 thereon which forms a connection or anchor for the opposite end of the shoulder strap.

The elongated rod 2 is of light tubular metal having a bushing 36 retained in its inner end by means of knurled grooves 37 in the wall of the tube deformed into grooves in the exterior of the bushing. The bushing is internally threaded at 38 to receive the threaded end 24 of the piston rod. The connection is locked in place by the lock nut 40. The left or inner end of the piston rod is flatted as at 41 to have sliding nonrotatable engagement through a noncircular opening 41A in the bearing 16. (See FIG. 3.) Thus neither the piston rod nor the shaker rod rotate.

At its outer end the tubular shaker rod or member is provided with a second bushing 42 that is secured in the tube by inwardly rolled ribs 43. The bushing 42 is internally threaded to receive the inner or left end of a rod 44 on the limb engaging member 4. A lock nut 45 secures the rod 44 in position.

The rod 44 of the limb engaging member projects coaxially from the elongated shaker rod 2 in a finger 46 from which depending and divergent fingers 47 and 48 project. The fingers 46, 47 and 48 and the adjacent portions of the rod 44 are covered with a coating 49 of rubber or similar deformable cushioning material.

As has been noted the elongated tubular rod or shaker member 2 may be of varying lengths to reach tree limbs at different heights. Further rods of different lengths are easily interchangeable in the connecting member 3 by simply releasing the outer or right clamp screw 31, unscrewing the threaded connection at 21, and sliding the connecting member to the right to expose the lock nut 40 and the connection between the bushing 36 and the end of the piston rod. After the connection is released, the shaker rod is drawn out of the bearing 25 and another rod of different length is inserted in its place.

The limb shaker device is light and inexpensive and easily carried through an orchard by means of the shoulder strap 32. The tubular connecting member 3 has a central portion 50 of reduced outside diameter forming a convenient hand grip which together with the grip portion 51 of the motor body facilitate positioning the limb engaging member 4 in the desired position. The axially projecting finger 46 may be pressed against the side of a limb or a limb may be engaged between the fingers 46 and 47 or between fingers 47 and 48. The back side of finger 48 may also be hooked over a limb so that reciprocation of the piston rod imparts vibration to the shaker rod and in turn to the limb to shake fruit or nuts or even leaves from the limb. The cushion coating 49 prevents damage to the bark on the engaged limb.

What is claimed as new is:

1. In combination with a hand held tool having an automatically recipricable, fluid pressure operated piston with a piston rod extending from the body of the tool and threaded at its outer end, the body of the tool having an external thread on its end, a tubular member having an internal thread engaged with the thread on said body and extending therefrom in coaxial surrounding relation to the projecting portion of said rod and having a bushing in its outer end, a clamp engaged over the adjacent ends of said body and said tubular member, a first strap connection on said clamp, a retaining screw for said bushing extending through the wall of said tubular member and having a second strap connection on its outer end, a carrying strap having its ends attached to said strap connections, an elongated tubular shaker slidably received in said tubular member and projecting from the opposite end thereof from the body of said tool, a coupling secured to the inner end of said shaker and connected to the outer end of said piston rod, a limb engaging member secured to the outer end of said shaker and extending axially therebeyond, a pair of divergent limb engaging fingers projecting downwardly from said limb engaging member intermediate its ends, and a coating of yieldable material covering said fingers and the outer end of said limb engaging member.

2. The combination as defined in claim 1 in which said clamp is partially divided axially of said tubular member and is clamped separately to said tubular member and to the body of said tool.

3. The combination as defined in claim 2 in which the exterior of said tubular member is radially reduced intermediate of its ends to form a hand grip.

References Cited

UNITED STATES PATENTS

| | | | |
|---|---|---|---|
| 3,006,130 | 10/1961 | Jones | 56—328 |
| 3,174,269 | 3/1965 | Londo | 56—328 |

ROBERT PESHOCK, Primary Examiner

P. A. RAZZANO, Assistant Examiner